(12) United States Patent  (10) Patent No.: US 9,868,546 B2
Lapujade                     (45) Date of Patent:    Jan. 16, 2018

(54) DUAL-MODE VEHICLE LIGHT SYSTEM

(71) Applicant: Goodrich Lighting Systems, Inc., Phoenix, AZ (US)

(72) Inventor: Philippe Lapujade, Chandler, AZ (US)

(73) Assignee: Goodrich Lighting Systems, Inc., Phoenix, AZ (US)

( * ) Notice: Subject to any disclaimer, the term of this patent is extended or adjusted under 35 U.S.C. 154(b) by 319 days.

(21) Appl. No.: 14/746,270

(22) Filed: Jun. 22, 2015

(65) Prior Publication Data

US 2016/0368620 A1  Dec. 22, 2016

(51) Int. Cl.
  *B60Q 1/32* (2006.01)
  *F21S 10/02* (2006.01)
  *B64D 47/02* (2006.01)
  *B64D 7/00* (2006.01)
  *B64D 47/06* (2006.01)

(52) U.S. Cl.
  CPC .............. *B64D 47/02* (2013.01); *B64D 7/00* (2013.01); *B64D 47/06* (2013.01)

(58) Field of Classification Search
  CPC ........ B60Q 1/2607; B60Q 1/32; B60Q 9/008; B60Q 2400/20; B64D 47/02; B64D 47/06; B64D 2203/00; F21W 2101/06; F21S 48/20; F21S 48/21; F21S 48/215
  See application file for complete search history.

(56) References Cited

U.S. PATENT DOCUMENTS

| | | | | |
|---|---|---|---|---|
| 2,276,104 A | * | 3/1942 | Shaunessey | B60Q 1/2607 353/13 |
| 2,513,712 A | * | 7/1950 | Coombs | B60Q 1/2607 180/171 |
| 3,455,272 A | * | 7/1969 | Zeller | B64D 47/06 116/209 |
| 5,984,494 A | | 11/1999 | Chapman et al. | |
| 6,268,702 B1 | * | 7/2001 | Fleck | B64D 47/06 315/185 R |
| 6,461,029 B2 | * | 10/2002 | Gronemeier | B60Q 1/2696 340/982 |
| 6,568,833 B2 | * | 5/2003 | Worgan | B64D 47/06 174/16.3 |
| 7,055,994 B2 | | 6/2006 | Martin | |
| 7,275,839 B2 | * | 10/2007 | Coushaine | F21K 9/00 362/227 |
| 7,663,506 B2 | * | 2/2010 | Lundberg | B64D 47/06 340/945 |
| 8,454,212 B2 | | 6/2013 | Fabbri et al. | |
| 9,207,393 B2 | * | 12/2015 | Yang | G02B 6/0088 |
| 9,308,858 B2 | * | 4/2016 | Cho | B60Q 1/06 |

FOREIGN PATENT DOCUMENTS

| | | |
|---|---|---|
| EP | 2014552 A2 | 1/2009 |
| EP | 2837566 A1 | 2/2015 |
| WO | 0228711 A2 | 4/2002 |

OTHER PUBLICATIONS

Extended European Search Report, for European Patent Application No. 16175546.7, dated Dec. 7, 2016, 6 pages.

* cited by examiner

*Primary Examiner* — Ismael Negron
(74) *Attorney, Agent, or Firm* — Kinney & Lange, P.A.

(57) ABSTRACT

Light systems having an array of paired visible-light and infrared-light elements, each pair arranged such that a body of each visible-light element obstructs infrared-light emitted from its paired infrared-light element. A lens might be provided to cover the array of paired light elements.

20 Claims, 4 Drawing Sheets

United States Patent 9,868,546 B2

DUAL-MODE VEHICLE LIGHT SYSTEM

BACKGROUND

Formation lights are used on military aircraft to provide navigational assistance to aircrafts flying in formation. Formation lights can be affixed to exterior surfaces of aircraft. One or more formation lights can emit a light pattern that is oriented with respect to the aircraft. These oriented light patterns emitted by formation lights indicate the orientation of an aircraft illuminated by such lights. The formation lights can be used as indicators of a distance between an observer in an adjacent aircraft and the formation-light indicated aircraft. Military aircraft can not only be flown in formation, but they can take-off and land in formation. Such technical maneuvers, such as take-offs and landings in formation, can be facilitated by well-illuminated formation-lighting systems that indicate each aircraft's position to adjacent aircraft in formation.

Military aircraft can be called upon to perform operations in enemy territories. It can sometimes be advantageous to perform such operations in a stealth manner to minimize the aircraft's exposure to the enemy. Various ways of providing stealth capability to aircraft have been utilized. Stealth technologies include minimizing the visibility of an aircraft, reducing the sound emitted by the aircraft, providing a low-radar-signature airframe, providing a low-thermal-signature airframe, as well as others. These stealth techniques can make it difficult for pilots flying in formation to readily determine an adjacent aircraft's attitude and distance.

SUMMARY

One embodiment of the present invention relates to a dual-mode aviation formation-light system that includes an array of dual-mode lighting elements. Each of the dual-mode lighting elements includes a visible-light element configured to emit visible light so as to provide a visible-light illumination pattern substantially throughout a solid-angle hemisphere. Each of the dual-mode lighting elements includes an infrared-light element configured to emit infrared light so as to provide an infrared-light illumination pattern substantially throughout the solid-angle hemisphere while simultaneously emitting substantially no visible light. Each of the visible-light elements obstructs a common solid-angle shadowed portion of the infrared-light illumination pattern, thereby dividing the solid-angle hemisphere into a solid-angle illuminated portion and the solid-angle shadowed portion.

In an exemplary embodiment, a method of providing dual-mode formation lighting includes providing a plurality of dual-mode lighting elements. Each of the dual-mode lighting elements includes a visible-light element and an infrared-light element. The method includes emitting, when in a non-covert mode, visible light from the visible-light element of each of the plurality of dual-mode lighting elements. The method further includes emitting, when in a covert mode, infrared light from the infrared-light element of each of the plurality of dual-mode lighting elements. When in the covert mode, a solid-angle portion of the emitted infrared light of each infrared-light element of the plurality of dual-mode lighting elements is obscured by its paired visible-light element. The obscured solid-angle portion of infrared light of each infrared-light element is commonly aligned with the obscured solid-angle portions of infrared light of every other infrared-light element.

DETAILED DESCRIPTION

In this specification, an exemplary method of providing a hemispherical illumination pattern of visible light in a non-covert mode and a sub-hemispherical pattern of light in a covert mode will be described. First, with reference to FIGS. 1A-1B, exemplary illumination patterns for each of the covert and non-covert modes of operation will be described. Then, with reference to FIG. 2, an exemplary dual-mode formation light will be shown and described. Then, various methods of controlling an illumination pattern will be described, with reference to FIG. 3. Finally, geometric details of shadow control of illumination patterns will be described, with reference to FIG. 4.

Figure 1A:
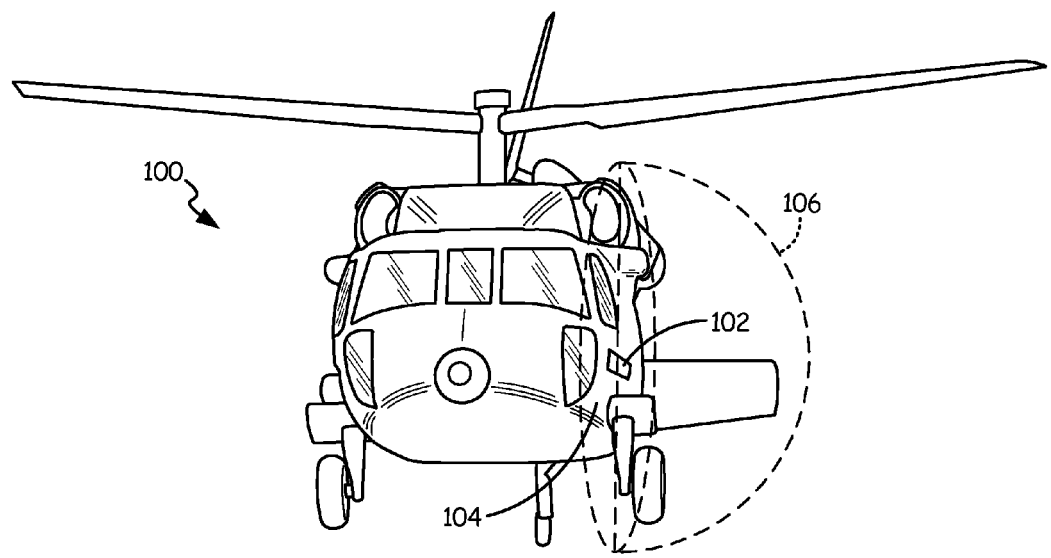
FIGS. 1A-1B are front perspective views of an aircraft and its illumination patterns from an exemplary aviation formation-light system.
Figure 1B:
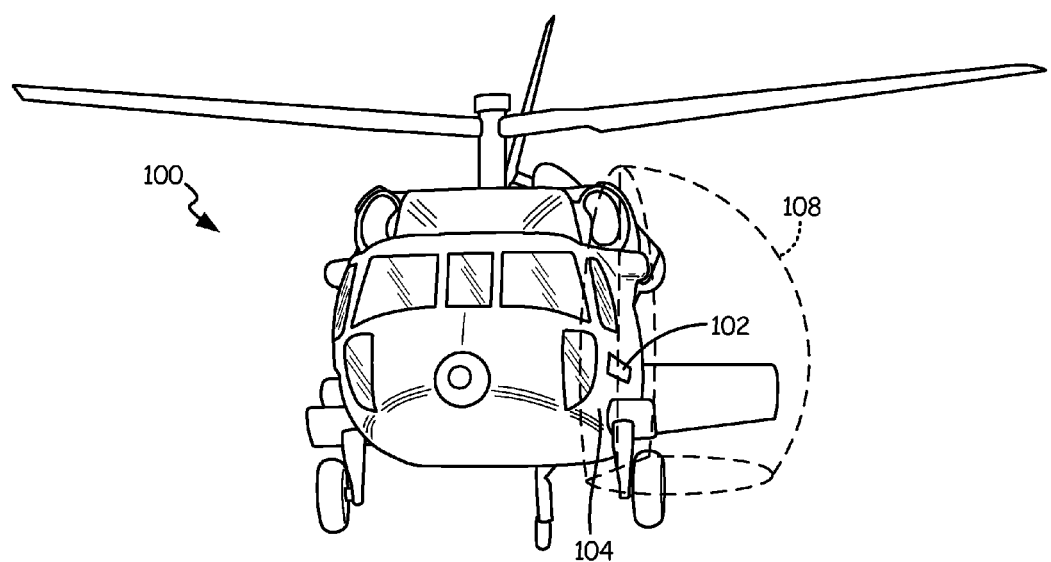

FIGS. 1A-1B are front perspective views of an aircraft and its illumination patterns from an exemplary aviation formation-light system. In FIG. 1A, aircraft 100 has exemplary aviation formation-light system 102 affixed to left lateral side 104 of aircraft 100. In FIG. 1A, aviation formation-light system 102 is depicted in a non-covert mode of operation. In the non-covert mode of operation, aviation formation-light system 102 emits a visible-light signal that can be observed from nearly everywhere in hemisphere 106 located on the same side of aircraft 100 as aviation formation-light system 102. Hemisphere 106 represents an illumination pattern that includes a solid angle of illumination/visibility of nearly two-pi steradians. Thus, a pilot or crew member in a second aircraft flying to the left side of aircraft 100 can observe the visible light signal emitted from aviation formation-light system 102 affixed to left lateral side 104 of aircraft 100. This nearly hemispherical solid angle of visibility 106 permits formation aircraft to fly anywhere—fore or aft, above or below—on the left side of aircraft 100 and still be able to visibly detect aviation formation-light system 102. Aircraft 100 could have additional formation lights located elsewhere on aircraft 100 to provide visible indication of its location. For example aircraft 100 could have an aviation formation light affixed to a right lateral side of aircraft 100.

In FIG. 1B, aviation formation-light system 102 is depicted in a covert mode of operation. In the covert mode of operation, aviation formation-light system 102 emits a covert-light signal that can be observed from anywhere within semi-sphere or sub-hemisphere 108 located on left side 104 of aircraft 100 as aviation formation-light system 102. Semi-sphere or sub-hemisphere illumination pattern 108 of the covert-light illumination signal subtends a portion of hemispherical illumination pattern 106 of the visible-light illumination signal emitted in the non-covert mode from aviation formation-light system 102. In some embodiments, the non-covert illumination signal can be a visible-light signal. In some embodiments, the covert-light illumination signal can be an infrared-light signal. The sub-hemispherical covert-light illumination signal is perceivable by an observer positioned anywhere within a less than two-pi steradian solid angle subtended by the sub-hemispherical covert-light illumination pattern 108. Sub-hemispherical covert-light illumination pattern 108 can be perceived by a second aircraft flying in formation to the left side of illumination of aircraft 100, but not by an observer located on a ground surface as aircraft 100 flies above. An exemplary dual-mode formation-light system can provide an illumination pattern observable to aircraft flying in formation therewith, while simultaneously and selectively shielding the illumination pattern from ground observers.

Providing formation lighting in both a covert mode and a non-covert mode can have one or more advantages. For example, providing formation-light signals over an entire lens area, either using visible light or infrared light, can provide a maximally-sized indicator signal to an observer in an adjacent aircraft. The area of light indication can be uncompromised in either a covert mode or a non-covert mode of operation. In some embodiments, when in a covert mode, substantially no light may be directed in ground-ward facing directions. Such directional control of formation-light signals can provide good directional and distance information to allied pilots while preventing enemy awareness of the same.

Figure 2:
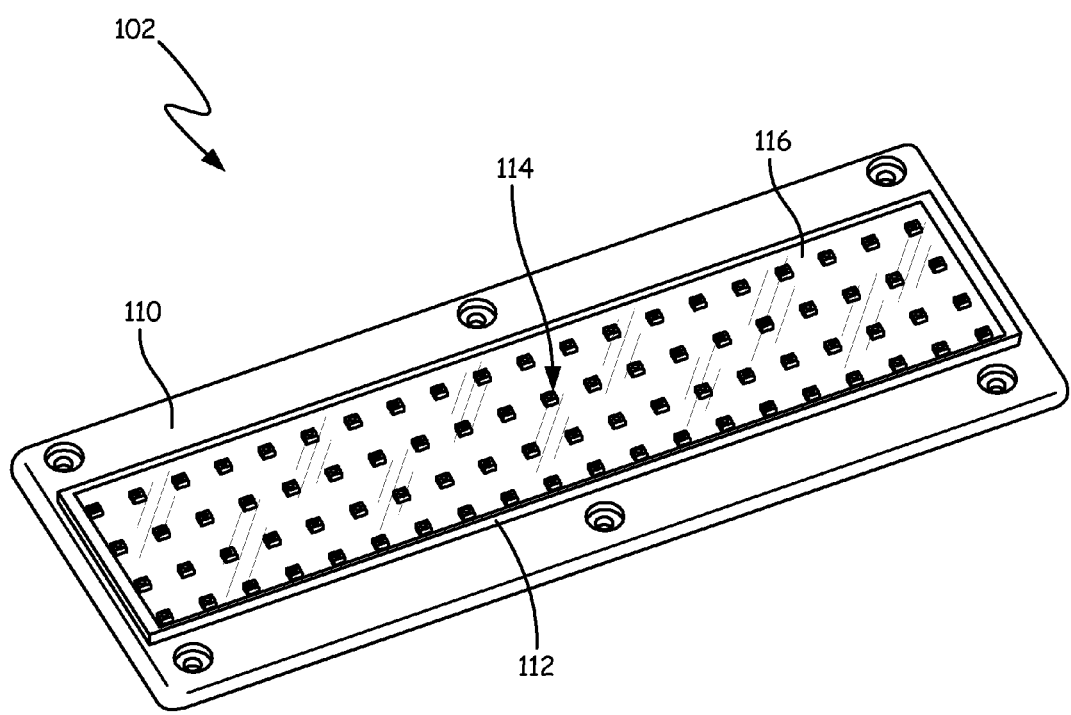
FIG. 2 is a perspective view of an exemplary dual-mode aviation-formation lighting system detached from an aircraft body.

FIG. 2 is a perspective view of an exemplary dual-mode light system detached from an aircraft body. In the FIG. 2 embodiment, exemplary dual-mode light system 102 includes housing 110, dual-mode lens 112 and an array of dual mode lighting pairs 114. Housing 110 can protect dual-mode lighting pairs 114 from various ambient atmospheric conditions in which an aircraft can find itself. In some embodiments, dual-mode lens 112 can be made of various materials capable of facilitating light transmission of both visible light and of covert light (e.g., infrared). Each of dual-mode light pairs 114 is capable of providing illumination in two modes: i) a covert mode and ii) a non-covert mode. In the non-covert mode, for example, each of the dual-mode light pairs 114 emits visible light. And in the covert mode, for example, each of the dual-mode light pairs 114 emits covert light (e.g., infrared light).

Dual-mode light pairs 114 can be distributed throughout an area of dual-mode lens 112. Such a distribution of dual-mode light pairs 114 can provide light transmission throughout the area of dual-mode lens 112. This full lens area transmission can provide a large area light signal to an observer. Dual-mode lens 112 can be shaped (e.g. rectangular, circular, arrow, etc.) so as to present a distinctive observable shape to an observer. In some embodiments, a majority of a top-surface area of housing 110 can be the area of dual-mode lens 112. For example, a ration of the area of dual-mode lens 112 to the top-surface area of housing 110 can be greater than about 50, 60, 75, 85, or about 90 percent. Utilizing the top-surface area in such a manner can maximize the size of a light signal of a limited area dual-mode light system 102.

Nearly hemispherical illumination patterns can be realized in the depicted dual-mode light system 102. Dual-mode light pairs 114 can be positioned just beneath dual-mode lens 112. Light can be emitted from dual-mode light pairs 114 and transmitted through dual-mode lens 112 in nearly hemispherical fashion. Angles of elevation for light rays that are most obliquely emitted through dual-mode lens 112 can be approach zero degrees above a plane tangent to surface 116 of dual-mode lens 112, for example. In an exemplary embodiment, dual-mode lens 112 can have a curvature or anti-reflection coating so as to facilitate a full-hemispherical illumination pattern.

Figure 3:
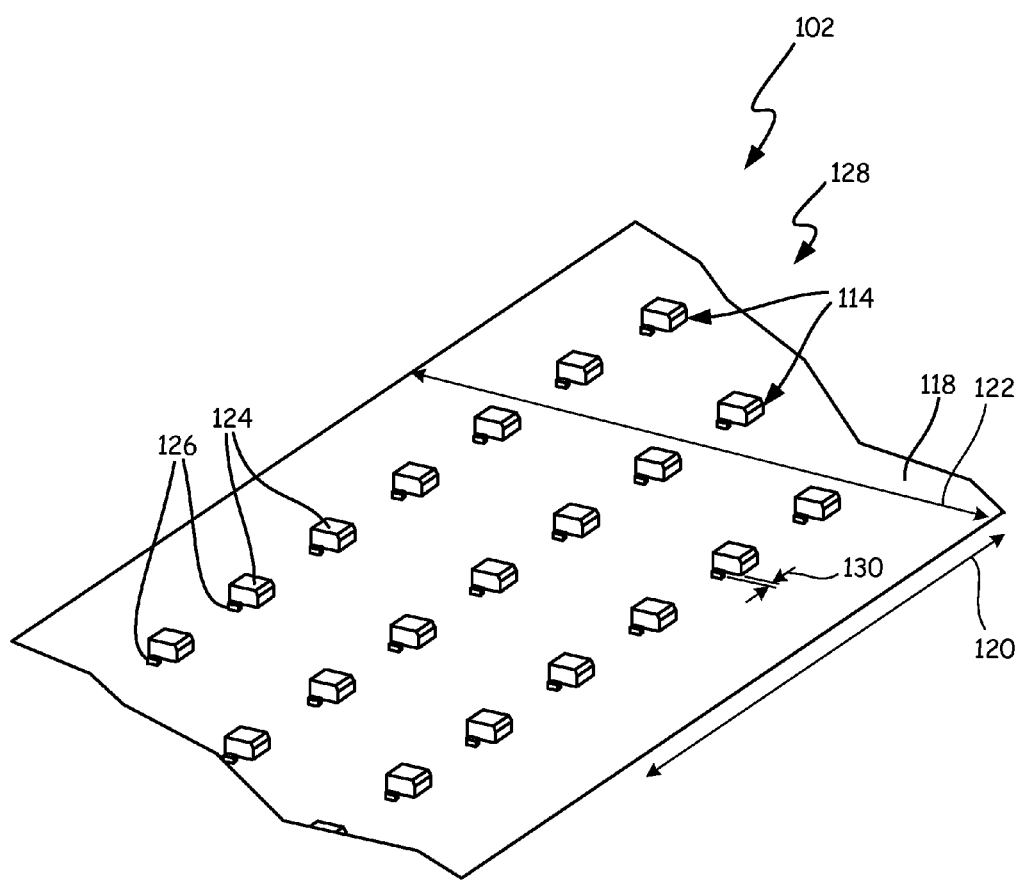
FIG. 3 is a perspective view of an exemplary array of paired infrared and visible-light elements.

FIG. 3 is a perspective view of an exemplary array of paired infrared and visible-light elements. In the FIG. 3 depiction, exemplary dual-mode formation-light system 102 is depicted without housing 110 or dual-mode lens 112 (e.g., as shown in FIG. 2). Substrate 118 has longitudinal axis 120 and lateral axis 122. Dual-mode light pairs 114 are coupled to substrate 118. Each of dual-mode light pairs 114 includes a pair of lighting elements: i) first light-emitting device 124; and ii) second light-emitting device 126. In the depicted embodiment, second light-emitting device 126 is smaller than first light-emitting device 124. Each pair of lighting pairs 114 is oriented in a common orientation with respect to substrate 118. For example, first and second light-emitting devices 124, 126 of each pair of lighting pairs 114 are aligned along an axis that is parallel with longitudinal axis 120. Each of first light-emitting devices 124 is closer to first longitudinal end 128 than its corresponding second light-emitting device 126 of the pair of lighting pairs 114 to which first and second light-emitting devices 124, 126 belong. A common separation distance 130 separates first and second light-emitting devices 124, 126 of each pair of lighting pairs 114.

Because of the common orientation of each of dual-mode lighting pairs 114, each of dual-mode lighting pairs 114 will share a common illumination pattern. For example, when a group of two or more first light-emitting devices 124 is energized so that each of the energized first light-emitting devices 124 emits a light signal, an illumination pattern of the group will be created. Because each of first light-emitting devices 124 is physically larger than every one of second light-emitting devices 126, the second light-emitting devices 126 will not obstruct the light emitted from the energized first light-emitting devices 124. Therefore, each of the energized first light-emitting devices 124 can emit light in a substantially-hemispherical illumination pattern. The resulting illumination pattern of the group can also be substantially-hemispherical.

When a group of two or more second light-emitting devices 126 is energized so that each of the energized second light-emitting devices 126 emits a light signal, an illumination pattern of the group will again be created. But because each of second light-emitting devices 126 is physically smaller than each of first light-emitting devices 124, first light-emitting devices 124 can obstruct light emitted from energized second light-emitting devices 126. Although each of second light-emitting devices 126 can emit light in a hemispherical illumination pattern, a portion of the emitted light can be absorbed and/or reflected by one or more of first light-emitting devices 124. Because each pair of lighting pairs 114 are aligned in a common orientation, any light rays emitted by second light-emitting device 126 and obstructed by first light-emitting device 124 of a pair of lighting pairs 114 can result in an illumination pattern that is common to each of pairs of lighting pairs 114. The resulting illumination pattern of the group will then be substantially the same as the illumination pattern of each of pairs of lighting pairs 114, albeit with an intensity substantially equal to the sum of the intensities of energized second light-emitting devices 126.

The exemplary arrangement of dual-mode lighting pairs 114 depicted in FIG. 3 can result in a dark region or blind zone when only second light-emitting devices 126 are energized. When an observer is situated in such a blind zone, even with energized second light-emitting devices 126 emitting light, first light-emitting devices 124 cast a shadow upon such an observer. Thus, an observer situated in such a blind zone might not be able to perceive the light emitted by second light-emitting devices 126. Directional control of the blind zone can be obtained by orienting substrate 118 appropriately. For example, if the blind zone is desired to be directly below a level aircraft flying in the sky, longitudinal axis 120 should be aligned vertically, with first longitudinally end 128, to which first light-emitting device 124 is closer than second light-emitting device 126 of each pair of lighting pairs 114, should be facing downward toward the ground surface. If, however, a blind zone is desired in a different direction, longitudinal axis 120 should be aligned with the desired blind zone direction, and first longitudinal end 128 should be directed toward the desired blind zone direction.

Various embodiments can have various configurations. For example, in some embodiments, first and second light-emitting devices 124, 126 or each pair of lighting pairs 114 can be aligned in a direction parallel to lateral axis 122 of substrate 118. In some embodiments, the alignment direction of each of pairs of lighting pairs 114 can be any angle with respect to axes 120, 122 of substrate 118. In some embodiments, substrate 118 can have any shape desired. For example, in an exemplary embodiment, a circularly shaped substrate can be used.

In some embodiments, a more than two light-emitting devices can be used in each of the lighting elements. For example, a triplet of light-emitting devices can be used in each lighting element. A specific juxtaposition of each of the light-emitting devices within the lighting element can result in three different illumination patterns, for instance. A first light-emitting device, for example, can emit light in an illumination pattern that is unobstructed by either a second or a third light-emitting device. The second light-emitting device can perhaps emit light that is partially obstructed by the first light-emitting device, but not by the third light-emitting device. The third light-emitting device can perhaps generate light that is partially obstructed by both the first and second light-emitting devices. Furthermore, each of the light-emitting devices in a lighting group can emit light of the same or different wavelengths of the other light-emitting devices in the lighting group. Thus, both illumination pattern and light color can be controlled by selecting which light-emitting device of each lighting element to energize.

Figure 4:
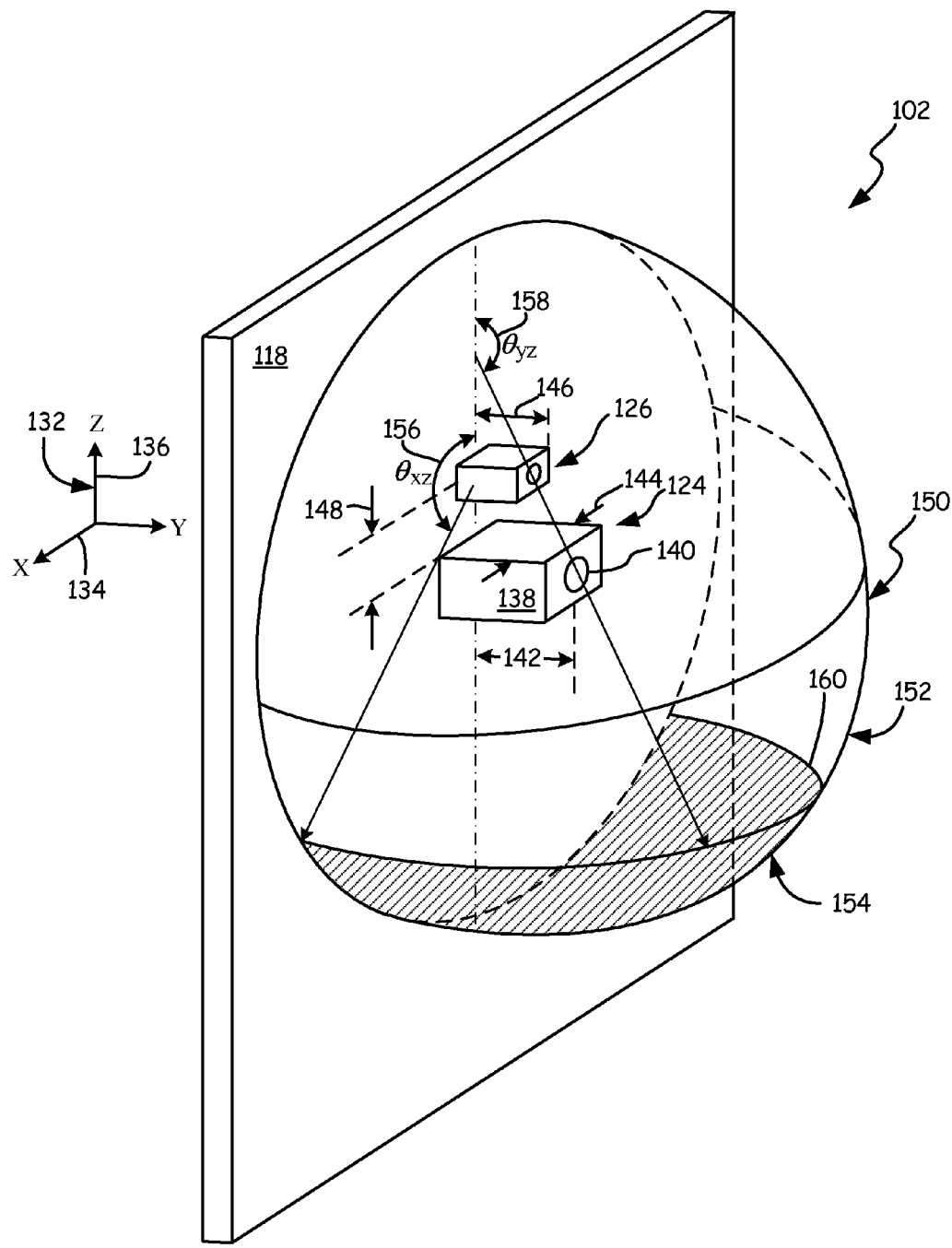
FIG. 4 is a schematic diagram of an illumination pattern of a single dual-mode lighting element.

FIG. 4 is a schematic diagram of an illumination pattern of a single dual-mode lighting element. In the FIG. 4 depiction, dual-mode lighting element 102 is at an origin of a three dimensional coordinate system 132. Dual-mode lighting element 102 includes first light-emitting device 124 and a second light-emitting device 126. Both first light-emitting device 124 and second light-emitting device 126 are attached to substrate 118. Substrate 118 is aligned parallel to the x-z coordinate axes 134, 136. First light-emitting device 124 has base 138 and light-emitting element 140. Base 138 of first light-emitting device 124 projects y-distance 142, $h_1$, from substrate 118. Base 138 of first light-emitting device 124 has lateral x-dimension 144, $w_1$, that controls a lateral extent of obstruction of light from second light-emitting device 126. Second light-emitting device 126 projects y-distance 146, $h_2$, above substrate 118. Y-distance projection 146, $h_2$, of second light-emitting device 126 is less than the y-distance projection 142, $h_1$, of base 138 of first light-emitting device 124. This difference of y-distance projections, $h_1$ and $h_2$, 142, 146 determines a shadowing pattern for light emitted from one of first and second light-emitting devices 124, 126. Second light-emitting device 126 is spaced from first light-emitting device 124 along z-axis 136 at separation distance 148, $d_{12}$. First light-emitting device 124 obstructs a portion of light emitted by second light-emitting device 126 in two dimensions (e.g. the x and z dimensions). This obstruction can separate a hemispherical lighting pattern 150 of light emitted from second light-emitting device 126 into light portion 152 and dark portion 154.

Dark portion 154 can be approximately characterized by x-z angle of obstruction 156, $\theta_{xz}$, and y-z angle of obstruction, $\theta_{yz}$ 158. $\theta_{yz}$ 158 defines that angle above which first light-emitting device 124 obstructs light emitted by second light-emitting device 126 in a y-z plane. In the depicted embodiment, if one assumes light emission from a point source, $\theta_{yz}$ 158 can be defined as:

$$\theta_{yz} = 180 - \tan^{-1}\left(\frac{h_1 - h_2}{d_{12}}\right).$$

Similarly, if one again assumes light emission from a point source, $\theta_{xz}$ 156 can be defined as:

$$\theta_{xz} = 180 - \tan^{-1}\left(\frac{w_1}{2d_{12}}\right).$$

$\theta_{xz}$ 156 defines the angle from the vertical or z-axis 136 above which shadowing begins where hemispherical lighting pattern 150 intersects substrate 118. $\theta_{yz}$ 158 defines the angle from the vertical or z-axis above which shadowing begins along a longitudinal line separating hemispherical lighting pattern 150 into two equal halves. $\theta_{xz}$ 156 and $\theta_{yz}$ 158 can be equal to one another in some embodiments. In other embodiments, $\theta_{xz}$ 156 and $\theta_{yz}$ 158 can be unequal to one another. The manner in which the angle of shadowing changes along light-dark boundary 160 can depend on the shape of corner 164 of base 138 of first light-emitting device 124.

Various embodiments can include various types of light-emitting devices. For example, in some embodiments a visible-light device can be paired with an infrared-light device in each of the dual-mode light-emitting devices. The visible-light device can be energized during a non-covert mode of operation. The infrared-light device can be energized during non-covert mode of operation. The visible-light device can obscure a portion of the infrared-light device creating a cone of darkness, in which an observer can reside in a shadow cast by the visible-light device. In some embodiments, the visible-light device can be unenergized during the covert mode of operation. The infrared-light device is unenergized during the non-covert mode of operation. In some embodiments, both the devices of a dual-mode light-emitting device can be visible-light devices. In some embodiments, both the devices of a dual-mode light-emitting device can be infrared-light devices.

The following are non-exclusive descriptions of possible embodiments of the present invention.

A dual-mode aviation formation-light system includes an array of dual-mode lighting elements. Each of the dual-mode lighting elements includes a visible-light element configured to emit visible light so as to provide a visible-light illumination pattern substantially throughout a solid-angle hemisphere. Each of the dual-mode lighting elements includes an infrared-light element configured to emit infra-red light so as to provide an infrared-light illumination pattern substantially throughout the solid-angle hemisphere while simultaneously emitting substantially no visible light. Each of the visible-light elements obstructs a common solid-angle shadowed portion of the infrared-light illumination pattern, thereby dividing the solid-angle hemisphere into a solid-angle illuminated portion and the solid-angle shadowed portion.

The dual-mode aviation formation-light system of the preceding paragraph can optionally include a dual-mode lens covering the array of paired lighting elements, the visible light and infrared light emitted by the array of paired lighting elements transmitting through the dual-mode lens. A further embodiment of any of the foregoing dual-mode aviation formation-light systems, wherein each of the paired lighting elements can be further oriented such that the visible-light element projects from a substrate to a height above a projection height of the infrared-light element. A further embodiment of any of the foregoing dual-mode aviation formation-light systems, wherein the solid-angle shadowed portion of the infrared-light illumination pattern can be within a cone having a central axis oriented in a principal direction of obstruction, the cone having a cone angle equal to a predetermined angle. A further embodiment of any of the foregoing dual-mode aviation formation-light systems, wherein the predetermined angle is any of 30 or 45 degrees. A further embodiment of any of the foregoing dual-mode aviation formation-light systems, wherein the emitted infrared light comprises near-infrared wavelengths. A further embodiment of any of the foregoing dual-mode aviation formation-light systems, wherein each obstructing visible-light element is either substantially absorptive of infrared light or substantially reflective of infrared light. A further embodiment of any of the foregoing dual-mode aviation formation-light systems, wherein, when in the first mode, visible light can be transmitted through substantially an entire area of the dual-mode lens covering, and when in the second mode, infrared light can be transmitted through substantially the entire area of the dual-mode lens covering.

A method of providing dual-mode formation lighting includes providing a plurality of dual-mode lighting elements. Each of the dual-mode lighting elements includes a visible-light element and an infrared-light element. The method includes emitting, when in a non-covert mode, visible light from the visible-light element of each of the plurality of dual-mode lighting elements. The method further includes emitting, when in a covert mode, infrared light from the infrared-light element of each of the plurality of dual-mode lighting elements. When in the covert mode, a solid-angle portion of the emitted infrared light of each infrared-light element of the plurality of dual-mode lighting elements is obscured by its paired visible-light element. The obscured solid-angle portion of infrared light of each infrared-light element is commonly aligned with the obscured solid-angle portions of infrared light of every other infrared-light element.

The method of the preceding paragraph can optionally include transmitting the emitted infrared light through a common lens when in the covert mode, and transmitting the emitted visible light through the common lens when in the non-covert mode. A further embodiment of the foregoing method, wherein, when in the covert mode, the emitted infrared light can be transmitted substantially throughout an entire area of the common lens, and when in the non-covert mode, the emitted visible light can be transmitted substantially throughout the entire area of the common lens. A further embodiment of any of the foregoing methods, wherein, when in the non-covert mode, the emitted visible light can provide a substantially hemispherical illumination pattern. A further embodiment of any of the foregoing methods, when in the covert mode, an illumination pattern of the emitted and shadowed infrared light provides infrared illumination to a portion of the substantially hemispherical illumination pattern.

A dual-mode aviation formation-light system includes a substrate and an array of paired lighting elements. Each of the paired lighting elements includes a visible-light element projecting from the substrate to a first height and configured to emit visible light in a first mode so as to provide a visible-light illumination pattern substantially throughout the solid-angle hemisphere. Each of the paired lighting elements includes an infrared-light element projecting from the substrate to a second height less than the first height and configured to emit infrared light while simultaneously emitting substantially no visible light in a second mode so as to provide an infrared-light illumination pattern. Each of the paired lighting elements is oriented such that the visible-light element is positioned to obstruct a common solid-angle hemisphere into a solid-angle illuminated portion and the solid-angle shadowed portion.

The dual-mode aviation formation-light system of the preceding paragraph can optionally include a dual-mode lens covering the array of paired lighting elements, the visible light and infrared light emitted by the array of paired lighting elements transmitting through the dual-mode lens. A further embodiment of any of the foregoing dual-mode aviation formation-light systems, wherein the solid-angle shadowed portion of the infrared-light illumination pattern is within a cone having a central axis oriented in a principal direction of obstruction, the cone having a cone angle equal to a predetermined angle. A further embodiment of any of the foregoing dual-mode aviation formation-light systems, wherein predetermined angle can be 30 or 45 degrees.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dual-mode aviation formation-light system comprising:
   an array of paired lighting elements, each of the paired lighting elements comprising:
   a visible-light element configured to emit visible light in a first mode so as to provide a visible-light illumination pattern substantially throughout a solid-angle hemisphere; and
   an infrared-light element configured to emit infrared light while simultaneously emitting substantially no visible light in a second mode so as to provide an infrared-light illumination pattern,
   wherein each of the paired lighting elements is oriented such that the visible-light element is positioned to obstruct a common solid-angle shadowed portion of the infrared-light illumination pattern emitted by the infrared-light element, thereby dividing the solid-angle hemisphere into a solid-angle illuminated portion and the solid-angle shadowed portion, and wherein each obstructing visible-light element is at least one of substantially absorptive and substantially reflective of infrared light.

2. The dual-mode aviation formation-light system of claim 1, wherein each of the paired lighting elements is further oriented such that the visible-light element projects from a substrate to a height above a projection height of the infrared-light element.

3. The dual-mode aviation formation-light system of claim 1, wherein the emitted infrared light comprises near-infrared wavelengths.

4. The dual-mode aviation formation-light system of claim 1, wherein each obstructing visible-light element is substantially absorptive of infrared light.

5. The dual-mode aviation formation-light system of claim 1, wherein each obstructing visible-light element is substantially reflective of infrared light.

6. The dual-mode aviation formation-light system of claim 1, further comprising a dual-mode lens covering the array of paired lighting elements, the visible light and infrared light emitted by the array of paired lighting elements transmitting through the dual-mode lens.

7. The dual-mode aviation formation-light system of claim 6, wherein, when in the first mode, visible light is transmitted through substantially an entire area of the dual-mode lens, and when in the second mode, infrared light is transmitted through a portion of the dual-mode lens.

8. The dual-mode aviation formation-light system of claim 1, wherein the solid-angle shadowed portion of the infrared-light illumination pattern has an obstruction pattern characterized by $\theta_{XZ}$ and $\theta_{YZ}$ angles with respect to a principal direction of obstruction.

9. The dual-mode aviation formation-light system of claim 8, wherein each of the $\theta_{XZ}$ and $\theta_{YZ}$ angles is greater than 30 degrees.

10. The dual-mode aviation formation-light system of claim 8, wherein each of the $\theta_{XZ}$ and $\theta_{YZ}$ angles is greater than 45 degrees.

11. A dual-mode aviation formation-light system comprising:
    a substrate; and
    an array of paired lighting elements, each of the paired lighting elements comprising:
        a visible-light element projecting a first height above the substrate and configured to emit visible light in a first mode so as to provide a visible-light illumination pattern substantially throughout the solid-angle hemisphere; and
        an infrared-light element projecting a second height above the substrate, the second height less than the first height, and configured to emit infrared light while simultaneously emitting substantially no visible light in a second mode so as to provide an infrared-light illumination pattern,
    wherein each of the paired lighting elements is oriented such that the visible-light element is positioned to obstruct a common solid-angle shadowed portion of the infrared-light illumination pattern emitted by the infrared-light element, thereby dividing the solid-angle hemisphere into a solid-angle illuminated portion and the solid-angle shadowed portion, and
    wherein each obstructing visible-light element is at least one of substantially absorptive and substantially reflective of infrared light.

12. The dual-mode aviation formation-light system of claim 11, further comprising a dual-mode lens covering the array of paired lighting elements, the visible light and infrared light emitted by the array of paired lighting elements transmitting through the dual-mode lens.

13. The dual-mode aviation formation-light system of claim 11, wherein the solid-angle shadowed portion of the infrared-light illumination pattern has an obstruction pattern characterized by $\theta_{XZ}$ and $\theta_{YZ}$ angles with respect to a principal direction of obstruction.

14. The dual-mode aviation formation-light system of claim 13, wherein each of the $\theta_{XZ}$ and $\theta_{YZ}$ angles is greater than 30 degrees.

15. The dual-mode aviation formation-light system of claim 13, wherein each of the $\theta_{XZ}$ and $\theta_{YZ}$ angles is greater than 45 degrees.

16. A method of providing dual-mode formation lighting, the method comprising:
    providing a plurality of paired lighting elements, each of the paired lighting elements comprising a visible-light element and an infrared-light element;
    emitting, when in a non-covert mode, visible light from the visible-light element of each of the plurality of paired lighting elements;
    emitting, when in a covert mode, infrared light from the infrared-light element of each of the plurality of paired lighting elements; and
    obscuring, when in the covert mode, a solid-angle portion of the infrared light emitted from each of the infrared-light elements of the plurality of paired lighting elements by its paired visible-light element, the obscured solid-angle portion of infrared light emitted from each infrared-light element commonly aligned with the obscured solid-angle portions of infrared light emitted from every other infrared-light element.

17. The method of claim 16, further comprising transmitting the emitted infrared light through a common lens when in the covert mode, and transmitting the emitted visible light through the common lens when in the non-covert mode.

18. The method of claim 17, wherein, when in the covert mode, the emitted infrared light is transmitted substantially throughout an entire area of the common lens, and when in the non-covert mode, the emitted visible light is transmitted substantially throughout the entire area of the common lens.

19. The method of claim 16, wherein, when in the non-covert mode, the emitted visible light provides a substantially hemispherical illumination pattern.

20. The method of claim 19, wherein, when in the covert mode, an illumination pattern of the emitted and shadowed infrared light provides infrared illumination to a portion of the substantially hemispherical illumination pattern.

* * * * *